United States Patent [19]
Yi

[11] Patent Number: 5,517,978
[45] Date of Patent: May 21, 1996

[54] POLLUTION CONTROL SYSTEM FOR AN INTERNAL COMBUSTION ENGINE

[75] Inventor: Alex C. Yi, Cerritos, Calif.

[73] Assignee: Rockwell International Corporation, Seal Beach, Calif.

[21] Appl. No.: 262,720

[22] Filed: Jun. 20, 1994

[51] Int. Cl.$^6$ .................................................. F02B 75/10
[52] U.S. Cl. ........................................ 123/585; 60/304
[58] Field of Search ................................ 123/585, 586, 123/587, 588, 1 A, 575, 568, 567, DIG. 12; 60/289, 275, 282, 307, 304, 317, 608; 95/271; 55/385.3, 399, 459.1, 349, DIG. 30, 267; 494/84

[56] References Cited

U.S. PATENT DOCUMENTS

| | | |
|---|---|---|
| 1,123,867 | 1/1915 | Gue . |
| 1,137,774 | 5/1915 | Mazza . |
| 1,273,929 | 7/1918 | Morrison . |
| 1,339,211 | 5/1920 | McKerahan . |
| 1,508,405 | 9/1924 | Mazza . |
| 2,394,357 | 8/1939 | Beese . |
| 2,444,222 | 8/1943 | Craig . |
| 3,251,542 | 5/1963 | Newgard et al. . |
| 3,817,232 | 6/1974 | Nakajima et al. ................ 123/568 |
| 3,828,552 | 8/1974 | Nishiguchi ......................... 60/304 |
| 3,877,450 | 4/1975 | Meeks . |
| 3,961,609 | 6/1976 | Gerry . |
| 4,078,535 | 3/1978 | Shafer . |
| 4,292,051 | 9/1981 | Kime . |
| 4,351,302 | 9/1982 | Brettler . |
| 4,585,466 | 4/1986 | Syred et al. ........................ 55/349 |
| 4,681,071 | 7/1987 | Smith . |
| 4,848,991 | 7/1989 | Bielefeldt ........................... 55/399 |
| 4,867,766 | 9/1989 | Campbell et al. . |
| 4,960,098 | 10/1990 | Akerib . |
| 5,117,800 | 6/1992 | Watson et al. ..................... 123/575 |
| 5,168,706 | 12/1992 | Kawamura ......................... 60/608 |

*Primary Examiner*—Marguerite Macy
*Attorney, Agent, or Firm*—Lawrence N. Ginsberg; Harry B. Field; George A. Montanye

[57] ABSTRACT

A pollution control system for an internal combustion engine comprises a mechanism for separating air from the environment into nitrogen enriched air and oxygen enriched air. The nitrogen enriched air is introduced to an internal combustion engine, thereby reducing engine combustion temperature and concomitantly reducing oxides of nitrogen ($NO_x$). A mechanism is also provided for introducing oxygen enriched air to the exhaust products of the internal combustion engine, the mixing of the exhaust products with oxygen enriched air minimizes pollution.

7 Claims, 4 Drawing Sheets

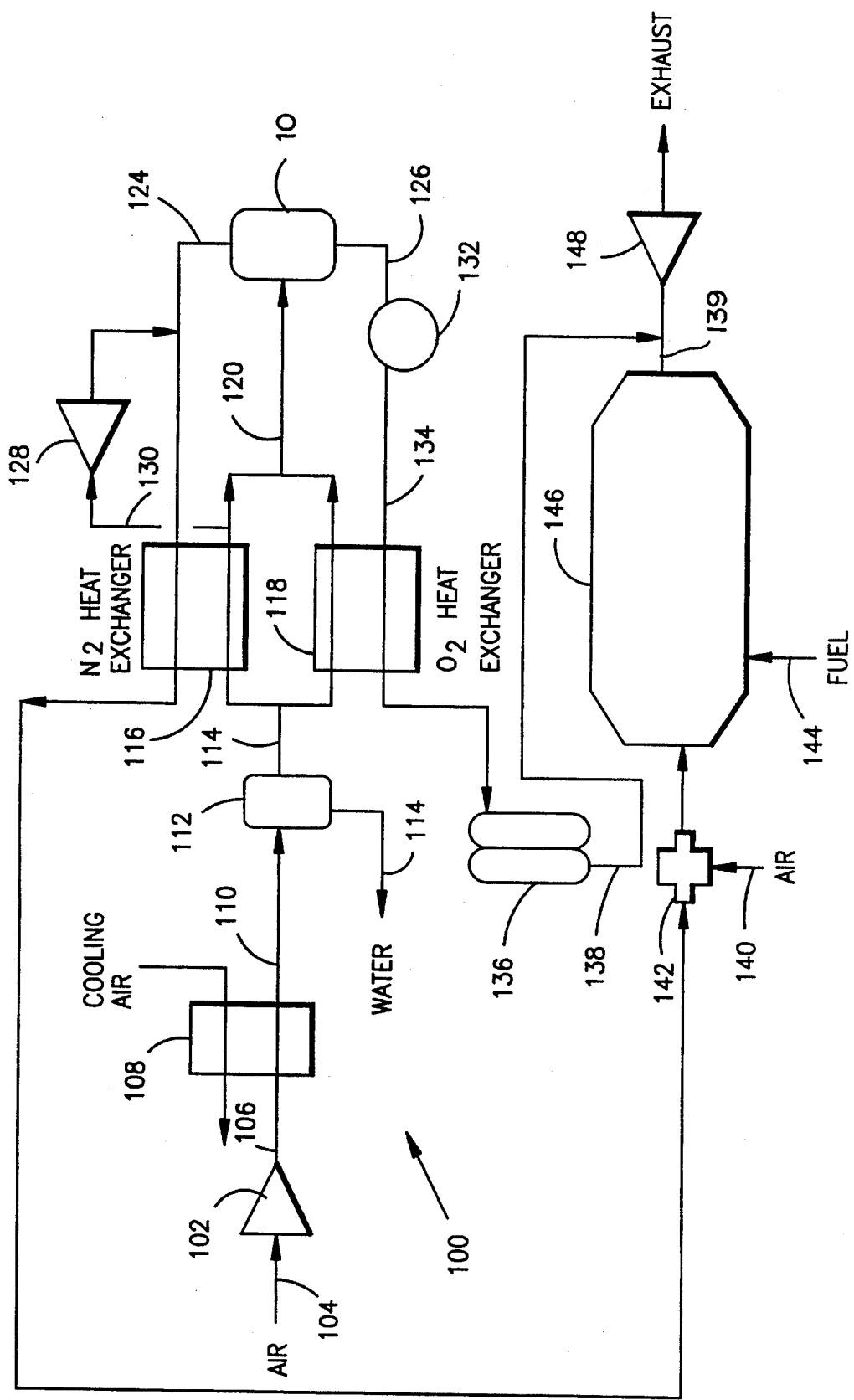

POLLUTION CONTROL SYSTEM FOR AN INTERNAL COMBUSTION ENGINE

BACKGROUND OF THE INVENTION

1. Field of the Invention

The present invention relates to internal combustion engines and, more particularly, to pollution control system for an internal combustion engines which utilizes vortex separation to supply nitrogen enriched air to the engine to reduce nitrogen oxides and to supply oxygen enriched air to engine exhaust products to further minimize pollution.

2. Description of the Related Art

The use of oxygen enriched air to reduce the content of toxic compounds from exhaust gases of automotive engines is known in the prior art. Nakajima et al., U.S. Pat. No. 3,817,232, for example, discloses the delivery of denitrified air, containing oxygen in a major proportion to a carburetor of an internal combustion engine.

The disclosed apparatus, however, is applicable to an internal combustion engine only after major modifications in the engine structure. Moreover, the patented structure requires the use of two pumps, forming an integral part of the air intake system for the engine, along with a air denitrifying unit. The latter operates by using a nitrogen impermeable membrane, for example, or a specified molecular sieve formed of pulverized zeolite.

Such a structure is complex, expensive, requires major engine modification, and is thus now easily adaptable for use with older cars, subsequent to production and sale. McKerahan, U.S. Pat. No. 1,339,211, discloses the use of a rotary concentrator for delivering oxygenated air at its output, in order to obtain a fuel saving by more complete combustion in smelting furnaces, blacksmith fires, steam boilers, gas engines and the like.

Similarly, U.S. Pat. No. 4,351,302, issued to D. H. Brettler, discloses an oxygen concentrator which utilizes a frustoconical structure for reducing the nitrogen content and enriching the oxygen content of air provided for use in an internal combustion engine. The Brettler device utilizes density differences, i.e. separation of heavier from lighter components of the incoming air, to separate the oxygen and nitrogen components thereof. Essentially, the Brettler device serves as a centrifuge. Its separation efficiency is quite low.

Separation processes are one of the most widely used industrial processes, especially in chemical and petrochemical industries. Such separation processes are also one of the most expensive industrial processes. They require costly capital investments such as distillation columns and high utility expenditures for both heating and cooling. Currently, the fractional distillation process is almost exclusively used for separation of species with high process rates. Other low flow rate processes, such as membrane, ion exchange, etc. are available with limited applications.

Separation of hot gases and cold gases by vortex separation methods is known. A single phase (gas) and single component (pure nitrogen, for example) vortex tube is known as the Ranqe-Hilsch tube illustrated in FIGS. 1 and 1b (Prior Art), designated generally as 1. In the tube, compressed gas is introduced through the nozzle 2 which is directed tangential to the tube. The gas generates a vortex as it travels into the center of the tube and propagates through the tube.

As the gas travels into the center of the vortex, the velocity of the gas increases due to the pressure gradient. The velocity is eventually reduced as the gas travels further into the tube center because the viscosity of the gas slows the fluid.

When the gas slows down in the center of the vortex, the gas has to surrender its kinetic energy. Kinetic energy in the vortex tube is released by transferring the energy from the inner to outer vortex. Thus, the energy separation occurs between the inner and outer vortex causing the temperature differential between the cold inner and hot outer vortex. The result of such an energy separation is that the hot gas 3 is directed in a first direction and cold gas 4 is directed in an opposite second direction.

Although the use of this Ranqe-Hilsch tube 1 is useful for refrigeration applications, it is not useful for providing separation of chemical species.

OBJECTS AND SUMMARY OF THE INVENTION

It is, therefore, a principal object of the present invention to minimize pollution from an internal combustion engine.

It is another object to provide a compact device which accomplishes the above objectives.

These and other objects are achieved by the present invention which is a pollution control system for an internal combustion engine. In its broad aspects, the present invention comprises means for separating air from the environment into nitrogen enriched air and oxygen enriched air. Means are provided for introducing the nitrogen enriched air to an internal combustion engine, thereby reducing engine combustion temperature and concomitantly reducing oxides of nitrogen ($NO_x$). Means are also provided for introducing oxygen enriched air to the exhaust products of the internal combustion engine. The mixing of the exhaust products with oxygen enriched air minimizes pollution.

Although the prior art dicusses utilizing oxygen enriched air to reduce air pollution, the present applicant is unaware of any system which utilizes nitrogen enriched air to reduce engine combustion temperature.

In its more narrow aspects, the present invention utilizes a vortex air separation apparatus for separating air from the environment into gaseous nitrogen enriched air and liquid oxygen enriched air. In such an instance, a compressor is used for receiving air from the environment and providing high pressure air output. Means are provided for cooling the high pressure air output to partially liquefied air having a mass fraction of less than 30% liquid. The vortex air separation apparatus can then be used to provide the necessary separation.

BRIEF DESCRIPTION OF THE DRAWINGS

FIG. 7 is a schematic flow diagram of the pollution control system of the present invention.

The same elements or parts throughout the figures are designated by the same reference characters.

DETAILED DESCRIPTION OF THE PREFERRED EMBODIMENTS

Figure 1B:
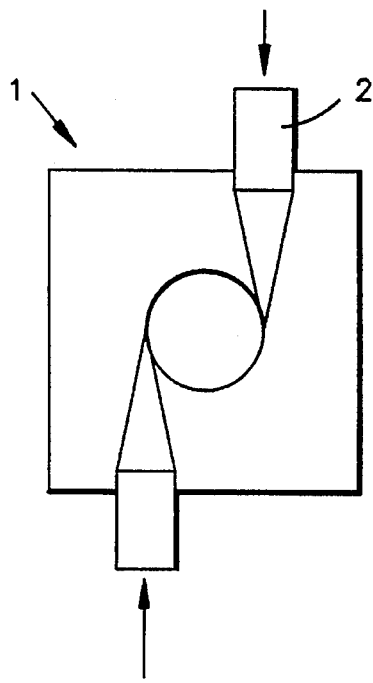
FIG. 1(b) (Prior Art) is an end view of the Ranqe-Hilsch vortex tube of FIG. 1(a).
Figure 1A:
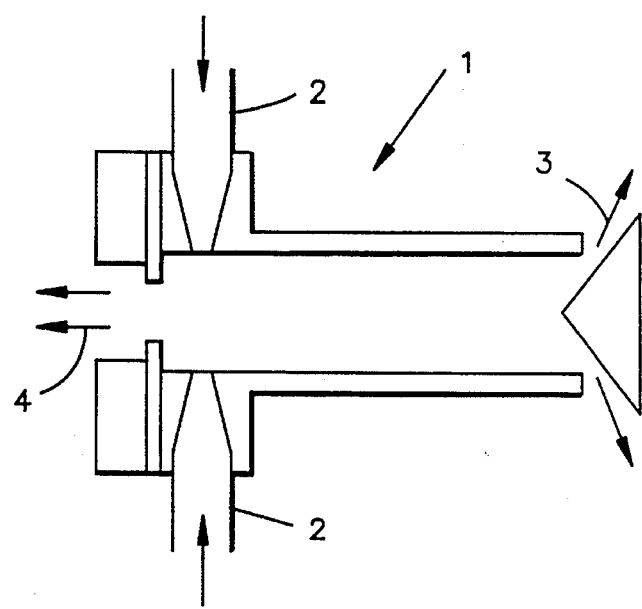
FIG. 1(a) (Prior Art) is a side elevation view in cross-section of a Ranqe-Hilsch vortex tube.

Referring again now to the drawings and the characters of reference marked thereon, FIG. 7 illustrates the pollution control system of the present invention, designated generally as 100. A compressor 102 receives air 104 from the environment and provides a high pressure air output 106. The output pressure ranges generally from about 50 psia to 150 psia, preferably around 110 psia. Air output 106 is then preferably introduced to a radiator 108. The radiator maybe of a conventional air-cooled type. The output 110 of air from the radiator is preferably that approaching ambient temperature. Storage device 112 separates liquid water 114 from gaseous air. The high pressure air 114 is therefore dehumidified. It is passed through a heat exchange system 116, 118. The output 120 is partially liquefied air having a mass fraction of less than 30% liquid. Generally, the partially liquefied air 120 is in a range of about 170°–190° R. The pressure is generally a little below the pressure compressor output pressure, typically about 100 psia. A vortex air separation apparatus, designated generally as 10, separates the partially liquefied air into gaseous nitrogen enriched air 124 and liquid oxygen enriched air 126. Vortex air separation apparatus 10 will be described in more detail below.

The gaseous nitrogen enriched air 124 is directed to the engine intake manifold 142. It is mixed with air 140 and then combined with fuel 144 for combustion in the engine 146, inasmuch as nitrogen enriched air is combusted, therefore reducing the engine combustion temperature and concomitantly reducing oxides of nitrogen ($NO_x$).

Generally, the nitrogen enriched air 124 is about 130°–150° R. and at a pressure of about 20 psia. Prior to being directed to manifold 142, nitrogen enriched air 124 is mixed with the output from a turbine 128 which receives an input 130 from a portion of the cooled high pressure air 114 from the compressor 102 outlet. This bypass is for system 10 startup. Since the system is generally at ambient temperature at the beginning of startup, it must be cooled to a cryogenic temperature. The turbine 128 cools down the air from the compressor 102 to such a cryogenic temperature.

Liquid oxygen enriched air 126 from the vortex air separator 122 is introduced to a pump 132. Prior to being pumped, the liquid oxygen enriched air 126 is generally at 150°–170° R., and about 20 psia. The output 134 from pump 132 is generally at a pressure 30–300 psia and at a temperature about 160° R. The oxygen enriched air is compressed to provide convenient storage. Output 134 is then directed through heat exchanger 118 and introduced into storage containers 136 at near ambient temperature. Storage containers 136 provide sufficient oxygen to the engine during cold start.

The oxygen enriched air 138 is then mixed with the engine exhaust 139, the mixing thereof thereby minimizing pollution.

A regenerative turbine 148 is preferably provided for receiving exhaust products from the engine 146 and utilizing the exhaust products for power generation.

Figure 2:
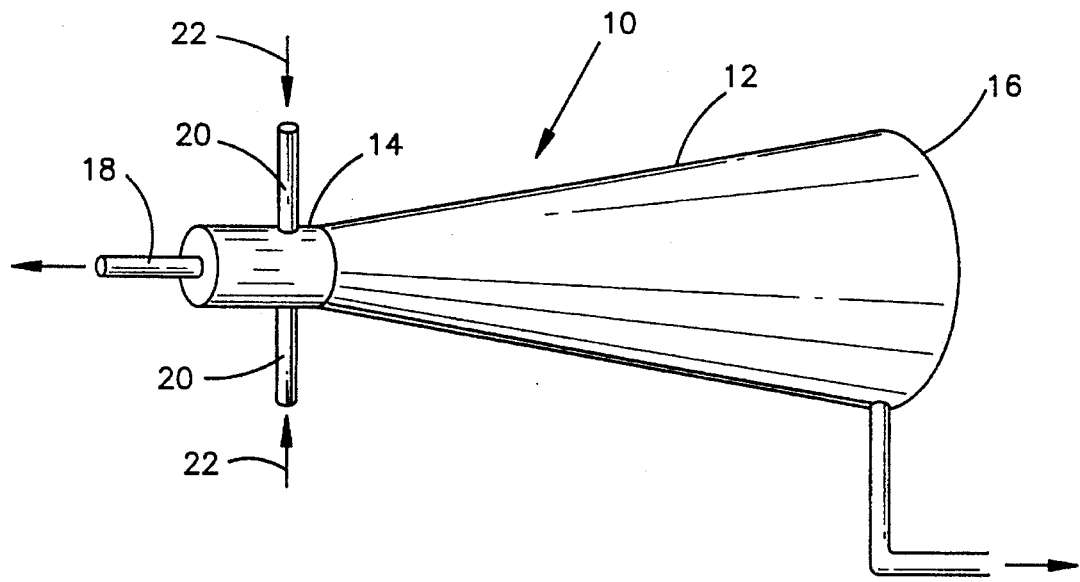
FIG. 2 is a perspective view of the two-phase flow vortex separator utilized by the present invention.
Figure 3:
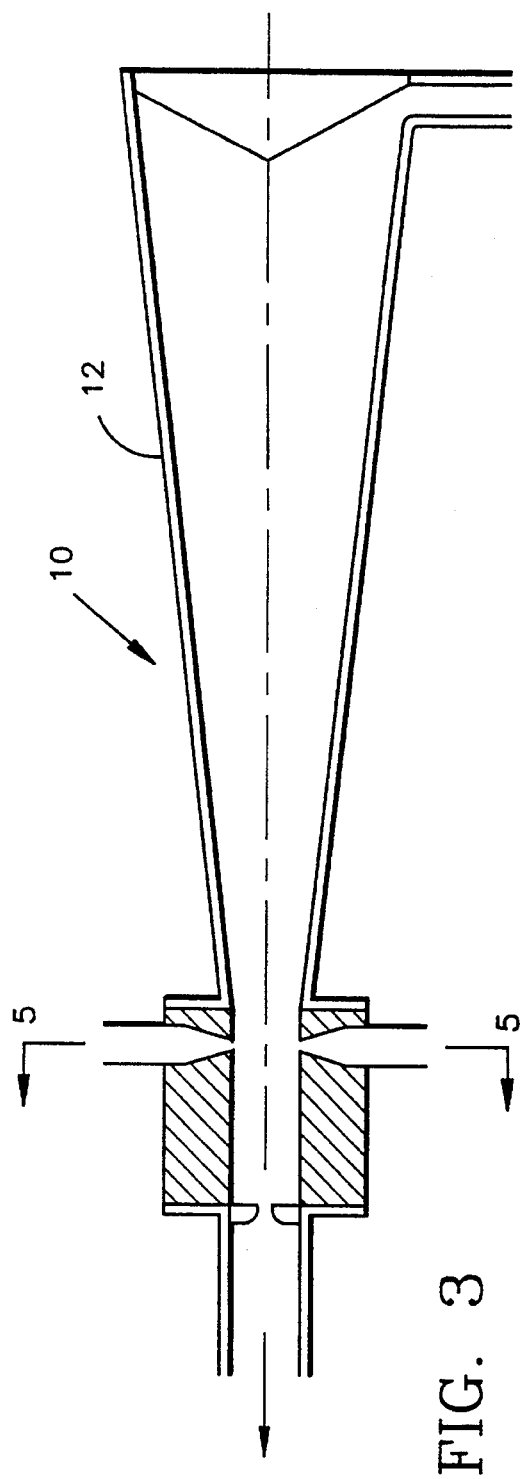
FIG. 3 is a cross-sectional view of the vortex separator of FIG. 2.

FIGS. 2 and 3 show a perspective view of the vortex air separation apparatus 10 preferably used for the system of the present invention. Apparatus 10 comprises an elongated enclosure 12 having a first end 14 and an opposite second end 16. The inner surface of the elongated enclosure 12 is of a truncated conical shape (i.e. frustoconical). The apex portion is at the first end 14 and the base portion is at the second end 16. The inner surface of enclosure 12 is preferably smooth so as to minimize unwanted friction effects. The first end or apex portion 14 preferably has a restricted orifice 18. Means 20 for introducing a partially liquified gaseous mixture is provided at the apex portion 14. Inlets 20 provide introduction of the gaseous mixture in a tangential direction relative to and adjacent to the inner surface of the enclosure 12.

Figure 4:
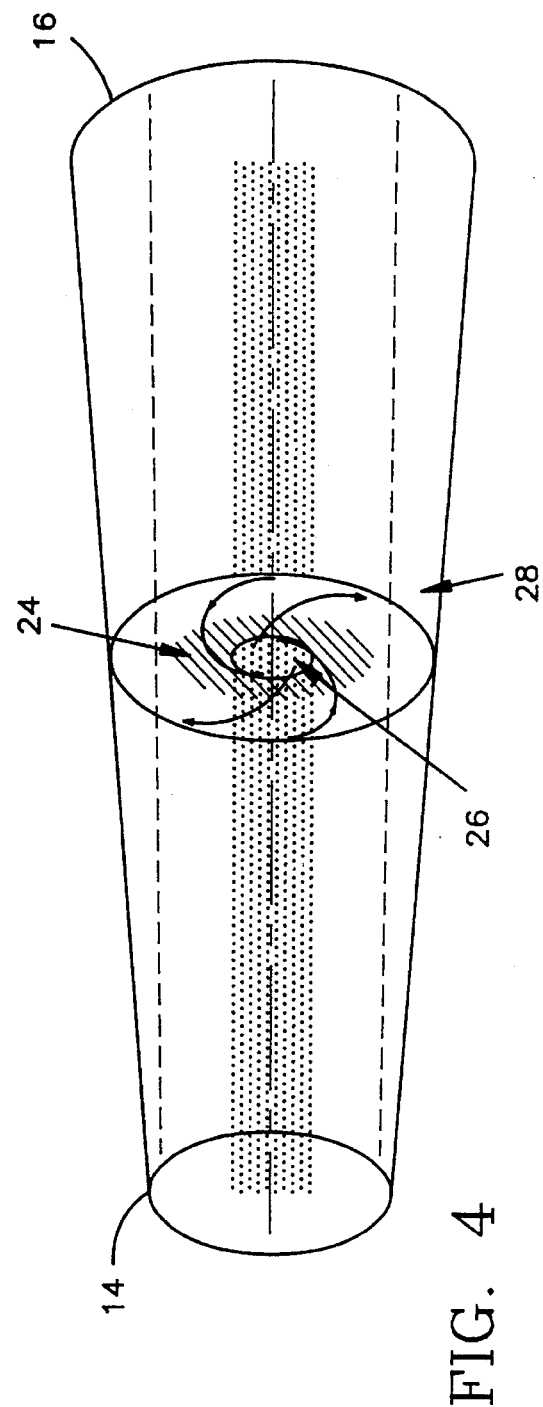
FIG. 4 is a perspective view of the vortex separator utilized by the present invention showing flow interaction.

Referring now to FIG. 4, during operation of apparatus 10, a partially liquefied gaseous mixture having a mass fraction of less than 30% liquid, designated by arrows 22, is introduced. The introduction of mixture 22 is in a tangential direction relative to and adjacent to the inner surface. Such an introduction of gas must be at a sufficient velocity to form a vortex region in the enclosure 12. This velocity is generally at near sonic speeds (about 0.5 to 0.8 Mach number.

The vortex region 24 contains two phases which interact. A first phase 26 is a gas comprising nitrogen enriched air, a relatively volatile chemical species. A second phase 28 is oxygen enriched air, a relatively less volatile chemical species. The relatively volatile first gas phase (i.e. $N_2$ enriched air) 26 exits the first end 14 of the enclosure 12. The relatively less volatile second phase (i.e. $O_2$ enriched air) 28 exits the second end 16 of the enclosure 12.

It is believed that the separation of the volatile and less volatile species operates in a manner similar to fractional distillation. The vapor mixture condenses in small droplets at the cold inner core and is enriched with less volatile species.

The principle of operation, as it relates to air, will now be described. The partially liquefied gaseous mixture, i.e. air, enters the inlet 20 where the air stream generates a high speed vortex. The vortex propagates down to the enclosure 12, where the oxygen, the less volatile species in the air, liquefies at the center axis. As the liquid droplets form at the inner vortex core, the centrifugal force of the rotating inner core throws them outward. Since the temperature of the outer core is higher than the inner core, the more volatile component (nitrogen) in the liquid droplets evaporate and moves toward the inner core. Thus, when the condensate reaches the wall of the vortex separator or closure 12, it is further enriched with oxygen.

The liquid droplets moving toward the outer core, and the vapor moving into the inner core are vigorously mixed by the turbulent vortex flow transferring mass and heat very efficiently. Similar mass and heat transfer occurs in the axial direction when the inner and outer vortex cores move in opposite directions as the outer vortex travels in the direction of end 16 in the axial direction.

In analogy to the process of fractional distillation, the cold inner core in the vortex closure 12 acts as a condenser/reflex, the hot outer core as a re-boiler and the turbulent mixing region as trays in the distillation column.

Eventually, the liquid condensate accumulates at the vortex enclosure inner wall enriched with oxygen. The liquid travels toward end 16 of the vortex enclosure due to pressure and gravity forces and is collected. Vapor with concentrated nitrogen leaves from the end 14 of the vortex enclosure 12.

Figure 5:
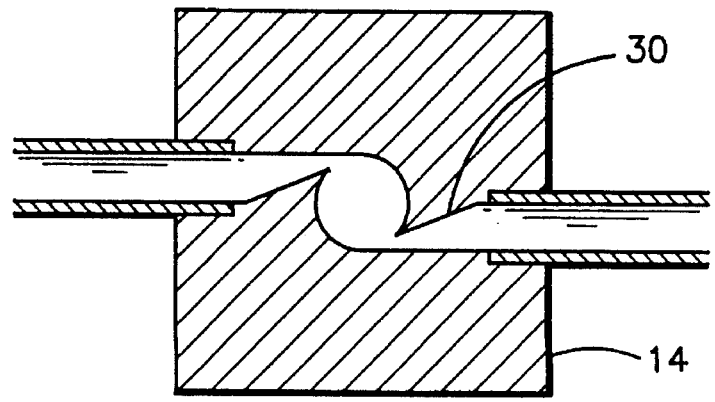
FIG. 5 is a cutaway end view of contracting conical inlets of the vortex separator of the present invention.

Referring now to FIG. 5, a cutaway end view of a first type of a gas mixture inlet comprising contracting conical inlets, designated generally as 30, is illustrated. Such contracting conical inlets 30 provide introduction of the gaseous mixture in the required tangential direction. Although the FIG. 5 shows only two conical inlets 30, it is preferable to have more inlets, perhaps up to around eight inlets 30.

Figure 6:
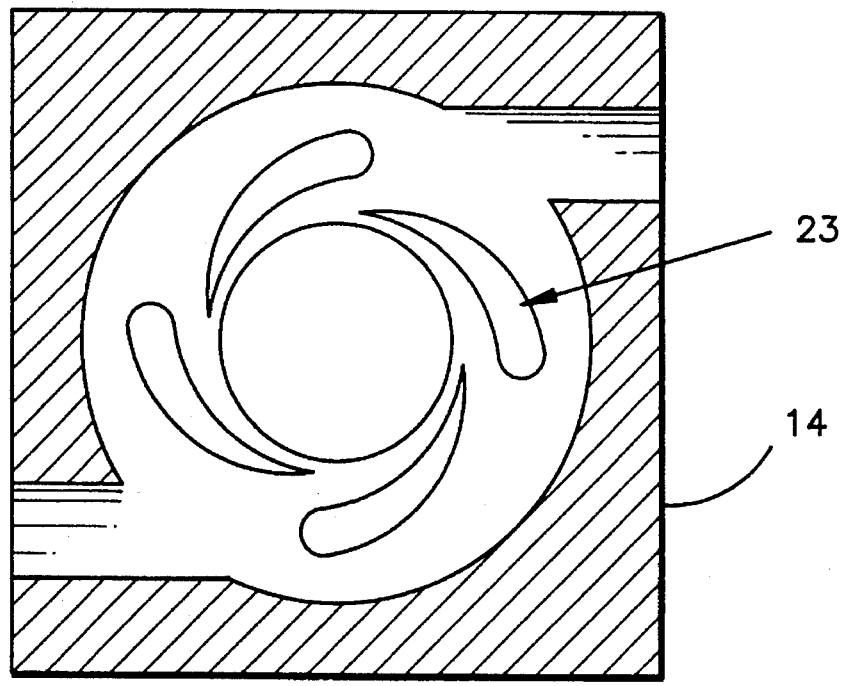
FIG. 6 is a cross-sectional view of alternate wing-type inlet vanes.

Referring now to FIG. 6, an alternate inlet configuration is illustrated comprising a plurality of vanes 23, each vane 23 having a wing-type cross-section. Use of vanes 23 minimize the abrupt expansion of gaseous flow.

Obviously, many modifications and variations of the present invention are possible in light of the above teachings. For example, although the present invention has been described relative to the use of a vortex air separation apparatus and the required compressor and heat exchanger system required to provide the partially liquefied air required for vortex air separation, other air separation processes may be used in lieu thereof. For example, fractional distillation techniquess, membrane processes, and Pressure Swing Absorption (PSA) and other known separation techniques can be used to provide the oxygen enriched air and nitrogen enriched air. The internal combustion engine may be any type of internal combustion engine including, for example, automobiles, airplanes, trains, ships, power generation plants and engines used in any industry or process. It is therefore to be understood that, within the scope of the appended claims, the invention may be practiced otherwise than as specifically described.

What is claimed and desired to be secured by Letters Patent of the United States is:

1. A pollution control system for an internal combustion engine, comprising:
    a) a compressor for receiving air from the environment and providing high pressure air output;
    b) means for cooling said high pressure air output to partially liquefied air having a mass fraction of less than 30% liquid;
    c) a vortex air apparatus for separating said partially liquefied air into gaseous nitrogen enriched air and liquid oxygen enriched air; and,
    d) means for introducing said nitrogen enriched air to an internal combustion engine, thereby reducing engine combustion temperature and concomitantly reducing oxides of nitrogen ($NO_x$).

2. The system of claim 1, wherein said means for cooling said high pressure air output comprises:
    heat exchanger means for receiving output flows of said gaseous nitrogen enriched air and liquid oxygen enriched air from said vortex air separation apparatus, said heat exchanger means directing said nitrogen enriched air to said means for introducing said nitrogen enriched air to said engine, and both said gaseous nitrogen enriched air and said liquid oxygen enriched air being in heat exchange relationship with said high pressure air output from said compressor.

3. The system of claim 2, further comprising a turbine having an input for receiving a predetermined portion of said high pressure air after said high pressure air is passed through said heat exchanger means, an output of said turbine being mixed with said gaseous nitrogen enriched air from said vortex air separation apparatus.

4. The system of claim 1, further including a radiator for receiving said high pressure air output from said compressor and for cooling said high pressure air output prior to said output being directed to said vortex air separation apparatus.

5. The system of claim 1, wherein said means for introducing said oxygen enriched air to said exhaust products of said engine comprises a pump for receiving liquid oxygen enriched air from said vortex air separation apparatus and compressing said oxygen enriched air prior to it being directed to said exhaust products of said engine.

6. The system of claim 5, wherein said means for introducing said oxygen enriched air to said exhaust products of said engine further comprises storage containers for receiving said compressed oxygen enriched air from said pump and storing it prior to introducing it into said exhaust products of said engine.

7. The system of claim 1 further including a regenerative turbine for receiving exhaust products from said engine mixed with said oxygen enriched air and utilizing said exhaust products and oxygen enriched air for power generation.

* * * * *